(12) United States Patent
Tzeng (10) Patent No.: US 7,836,005 B2
(45) Date of Patent: Nov. 16, 2010

(54) SYSTEM AND METHOD FOR AUTOMATIC GENERATION OF USER-ORIENTED HOMEPAGE

(75) Inventor: Jeng-Nan Tzeng, Xindian (TW)

(73) Assignee: Kuo-Hui Chien, Pan-Chiao, Taipei County (TW)

( * ) Notice: Subject to any disclaimer, the term of this patent is extended or adjusted under 35 U.S.C. 154(b) by 611 days.

(21) Appl. No.: 11/873,280

(22) Filed: Oct. 16, 2007

(65) Prior Publication Data

US 2009/0099995 A1 Apr. 16, 2009

(51) Int. Cl.
 *G06F 17/00* (2006.01)
 *G06N 5/02* (2006.01)
(52) U.S. Cl. .......................................... 706/50
(58) Field of Classification Search ............... 706/14
 See application file for complete search history.

(56) References Cited

U.S. PATENT DOCUMENTS 7,496,832 B2 * 2/2009 Chen et al. .................. 715/222
7,587,063 B2 * 9/2009 Hwang et al. ............... 382/100

* cited by examiner

*Primary Examiner*—Michael Holmes
(74) *Attorney, Agent, or Firm*—Pai Patent & Trademark Law Firm; Chao-Chang David Pai (57) ABSTRACT

The present invention discloses a system and a method for automatic generation of a user-oriented homepage, said system comprises an active real-time artificial intelligence network server working with a traditional network server and a fast relational data processing method to track and determine from a webpage browsing log server a user behavior for webpage browsing, and then to compile user browsing characteristics to design the webpage automatically into a user-oriented homepage. Therefore, every time when a user connects to a same URL, said user-oriented homepage presents information that said user requires or prefers.

7 Claims, 10 Drawing Sheets

SYSTEM AND METHOD FOR AUTOMATIC GENERATION OF USER-ORIENTED HOMEPAGE

BACKGROUND OF THE INVENTION

1. Field of the Invention

In the future, the Internet will evolve into an interaction-intensive network. The present invention discloses a system and method for automatic generation of user-oriented homepage, wherein a new generation network server will work with one or more AI (Artificial Intelligence) servers. When a network user browses the content of the network server, the AI server will predict possible data required by the user and compile a user-oriented homepage for that user.

2. Description of the Prior Art

Presently on the ubiquitous Internet, every ISP (internet service provider) is aggressively developing customized Internet information service. These services need a massive amount of users' network behavior data for feature statistics and numerical analysis or applied statistics in general.

Applied statistics uses intelligent technologies such as statistical analysis and data mining as tools to predict information requirements of users. The intelligent technology applications are issue-oriented intelligent data analysis. Data refers to existing facts such as texts, numbers, sounds and images. Users' network experience can be transferred into data for quantitative and qualitative analysis to provide further insight into the structure and hierarchy of user-invoked issues. Multidimensional Scaling (MDS) is a method traditionally used for speeding up data extraction and relational data analysis. MDS is frequently employed to search for company's market position and to use group/cluster analysis to find target customers or relational information. It may use variables chosen by specialists to conduct joint analysis to analyze user preferences, to understand user requirements and to improve customer services.

SUMMARY OF THE INVENTION

Figure 1:
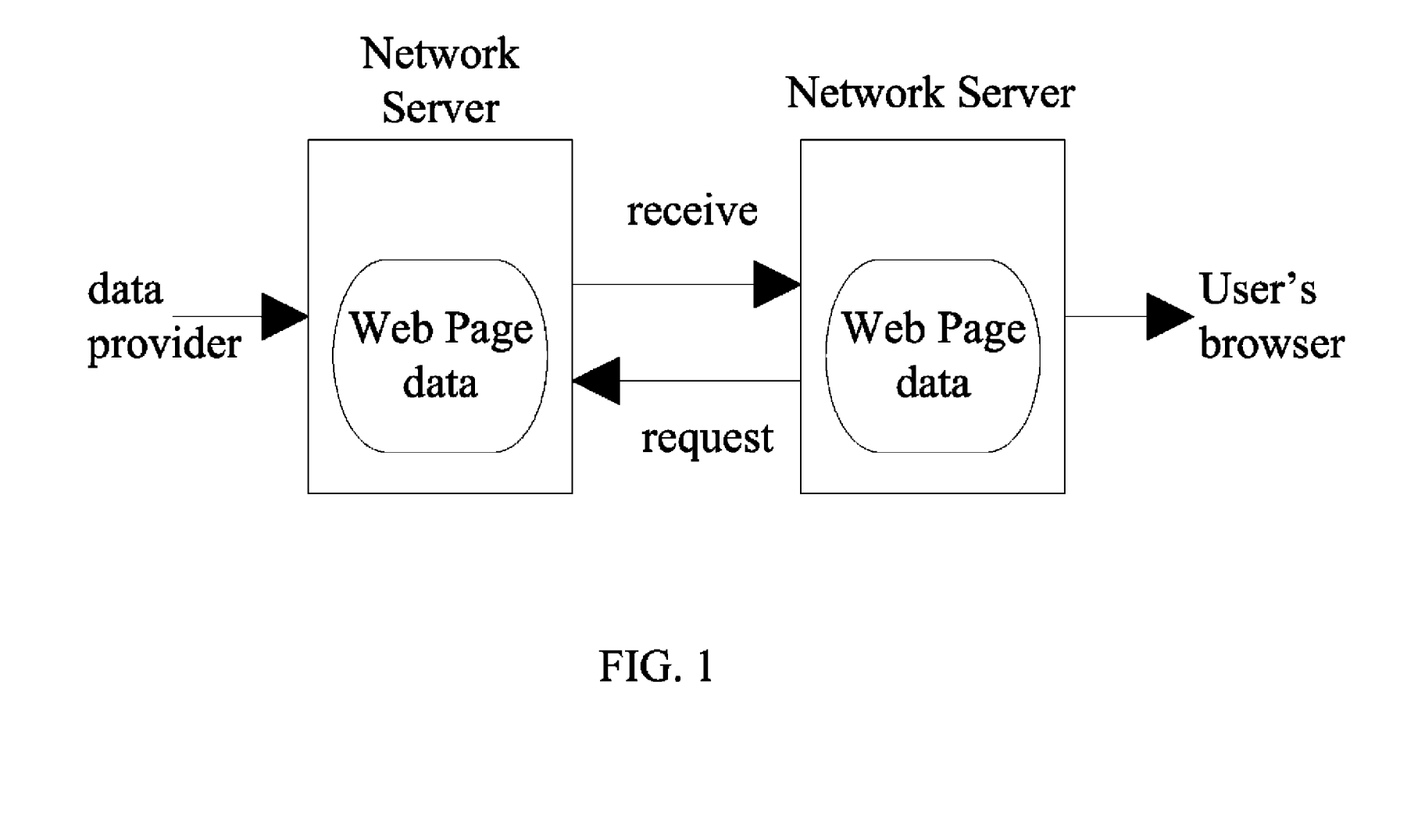
FIG. 1 illustrates a view of the webpage data flow in a traditional network server.
Figure 2:
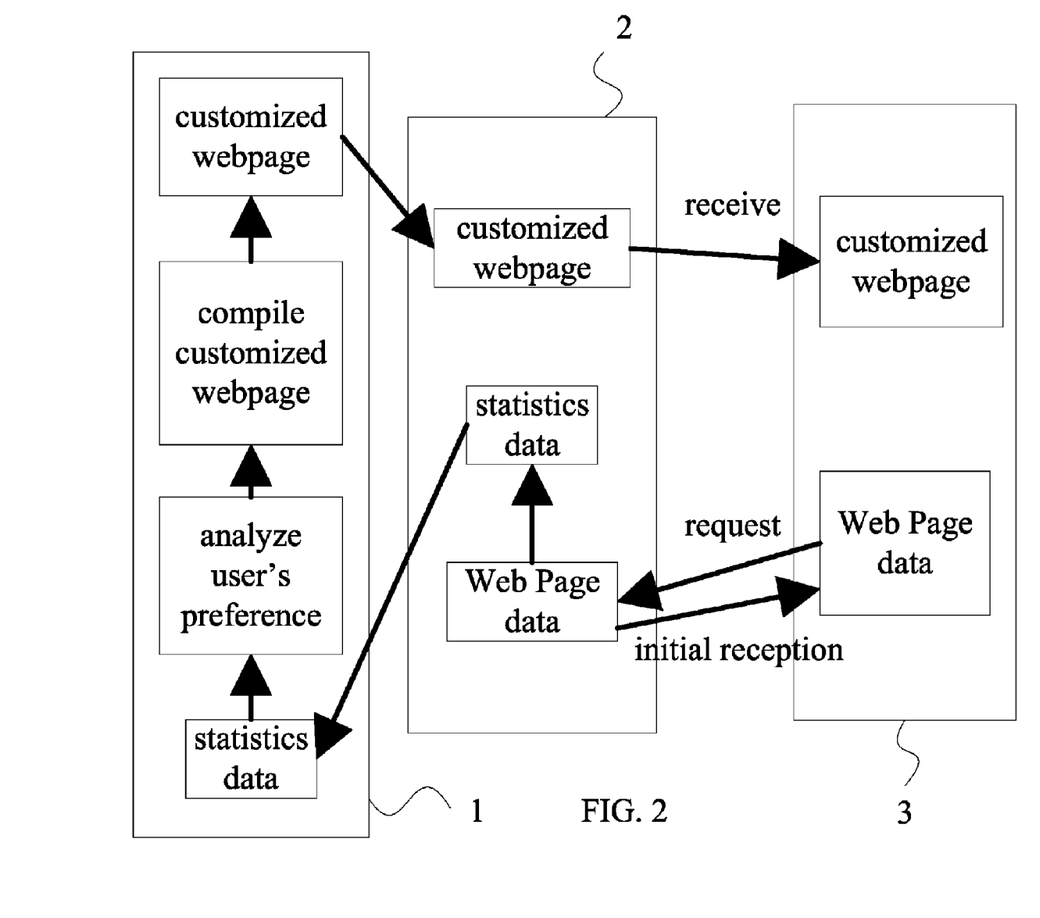
FIG. 2 illustrates a view of the webpage data flow in an intelligent network server.

As in traditional Internet browsing mode, a user first requests webpage data from a network server. Then the network server gets the webpage data from the webpage data provider and finally sends the webpage data to the user. This process is illustrated in FIG. 1. Please refer to FIG. 2 for a system structure of a system and method for automatic generation of user-oriented homepage. This method uses user's webpage reading information collected from the network server or engine of client to conduct a statistical analysis for a large-scale network behavior data. Finally, this method obtains user's preference characteristics to present desired Internet information immediately on the homepage, even as a user-oriented homepage for the user. This method is faster than the computation speed in implementing a relational network and more accurate in the analysis results. The relational network is established by finding the differences and similarities of all web pages on the Internet by using mathematical operations based on content, service, data or even extended links of the web pages. By comparing analysis between web pages, the relational network is formed. Relational networks are often applied in search functions of portal sites, for example, when a user inputs key words, the portal site would find relational network or web pages for that user. Considering the case in using the classical MDS method, which has the computational complexity of $O(N^2)$, the computational complexity will increase by square to the number of variables. If the number of users exceeds 100,000, it is not possible for the classical MDS method to find the relational networks within 24 hours. One possible modification is to randomly compute an approximate relational network with less accuracy. However, by using the fastest modified technique which has the computational complexity of $O(N^{3/2})$, it still takes a while to obtain the results. Although relational networks with less accuracy may be acceptable for entertainment and consumer markets, it can cause a great loss in financial investment applications. Therefore, it is a main object and value of the present invention to quickly obtain a relational network with high accuracy for users to get their information in time.

The present invention discloses a system and method for automatic generation of a user-oriented homepage. The system comprises a plurality of AI servers, which uses the method for automatic generation of a user-oriented homepage to compile a customized webpage based on user requirements. A network server is coupled to said plurality of AI servers to record users' usage data for said plurality of AI servers. A plurality of user terminals are connected to said network server via Internet to receive webpage data from said network server.

An AI server is an intelligent program using methods based on inference to process complex data. The structure of an AI server comprises:

1. A knowledge base system for storing data needed for inference;
2. An inference engine for controlling the process of inference;
3. A user interface for providing user help and consulting function;
4. A knowledge extraction interface for editing, adding/modifying the functions of the knowledge base; and
5. A work memory for storing the facts in the inference process.

The AI server uses the content currently browsed by the user and the predicted data based on the data provided by the network server to compile a webpage designed for the user. The AI server compiles a webpage contents that the user may want to see before his/her next login. It is as if every user has a personal network assistant for providing the most suitable information for the user wherever the user needs some information. Since different users have different preferences and habits for browsing information provided by the network server, the AI server can provide a user with webpages that he/she does not usually see but that are often clicked by other users having similar preferences. For new network users, due to insufficient information from previous browsing experience, the AI server will spontaneously create some related questions to enhance the speed in accumulating user-browsing behavior data. Therefore, providing network data for browsing in the present invention is not a passive service, but rather an automatic user-oriented webpage generation method.

The prevalence of wireless networks extends the existence of access points from fixed positions to virtually everywhere. Therefore, users can use not only PCs or notebook PCs to access the Internet, but also mobile phones, PDAs or other portable access devices to access the Internet in the future, making mobile networks more and more popular. Since the user browsing behavior is likely to be limited by the size of the screen. How to present the most important information and web link in the shortest time for user to click rather than input the complete URL, will be a critical factor for increasing browsing speed. The bottleneck in realizing the present invention is how to calculate the correlations between users in real time and to provide needed information among users. In the past, to get an accurate relational network, it is necessary to employ the traditional Multidimensional Scaling (MDS) method. This method needs the number of operations equal to O ($N^2$), which takes too long to implement real-time computation. The present invention discloses an active real-time intelligent network server and fast relational data processing method to provide a fast computing method to improve the number of operations from O ($N^3$) of MDS to O (N). This shows the significance of the present invention.

BRIEF DESCRIPTION OF THE DRAWINGS

The drawings disclose an illustrative embodiment of the present invention which serves to exemplify the various advantages and objects hereof, and are as follows:

FIGS. 5(*a*)~5(*d*) illustrate the computation results of projections of two thousand 8-dimensional helicoids;

DETAILED DESCRIPTION OF THE PREFERRED EMBODIMENT

The present invention discloses a system and method for automatic generation of a user-oriented homepage, said system comprising a plurality of AI servers, a network server coupled to the plurality of AI servers. The AI server compiles the webpage contents that the user may want to see before his/her next login. It is as if every user has a personal network assistant for providing the most suitable information for the user wherever the user needs some information.

In order to design a customized homepage, the method for automatic generation of user-oriented homepage in the present invention comprises the following steps:

Once in a predetermined period of time, a network server collects browsed webpage data of a user for an AI server to retrieve the data from the network server. The AI server analyzes the user preference of the user and obtains user network behavioral characteristics based on an algorithm of random-decomposing multidimensional scaling in applied statistics.

Then the AI server obtains a correlation map from the user network behavioral characteristics and a first relational network for computation. Then the AI server obtains group characteristics of the user in the first relational network and re-computes nearby relational networks based on the group characteristics of the user in the first relational network to obtain a second relational network of the user.

The AI server automatically generates a customized webpage based on a webpage index of the second relational network. The AI server sends the customized webpage as the user-oriented homepage to the network server for the next time the user connects to the network server. The network server automatically sends the customized webpage to a user terminal the next time the user connects to the network server.

Figure 3:
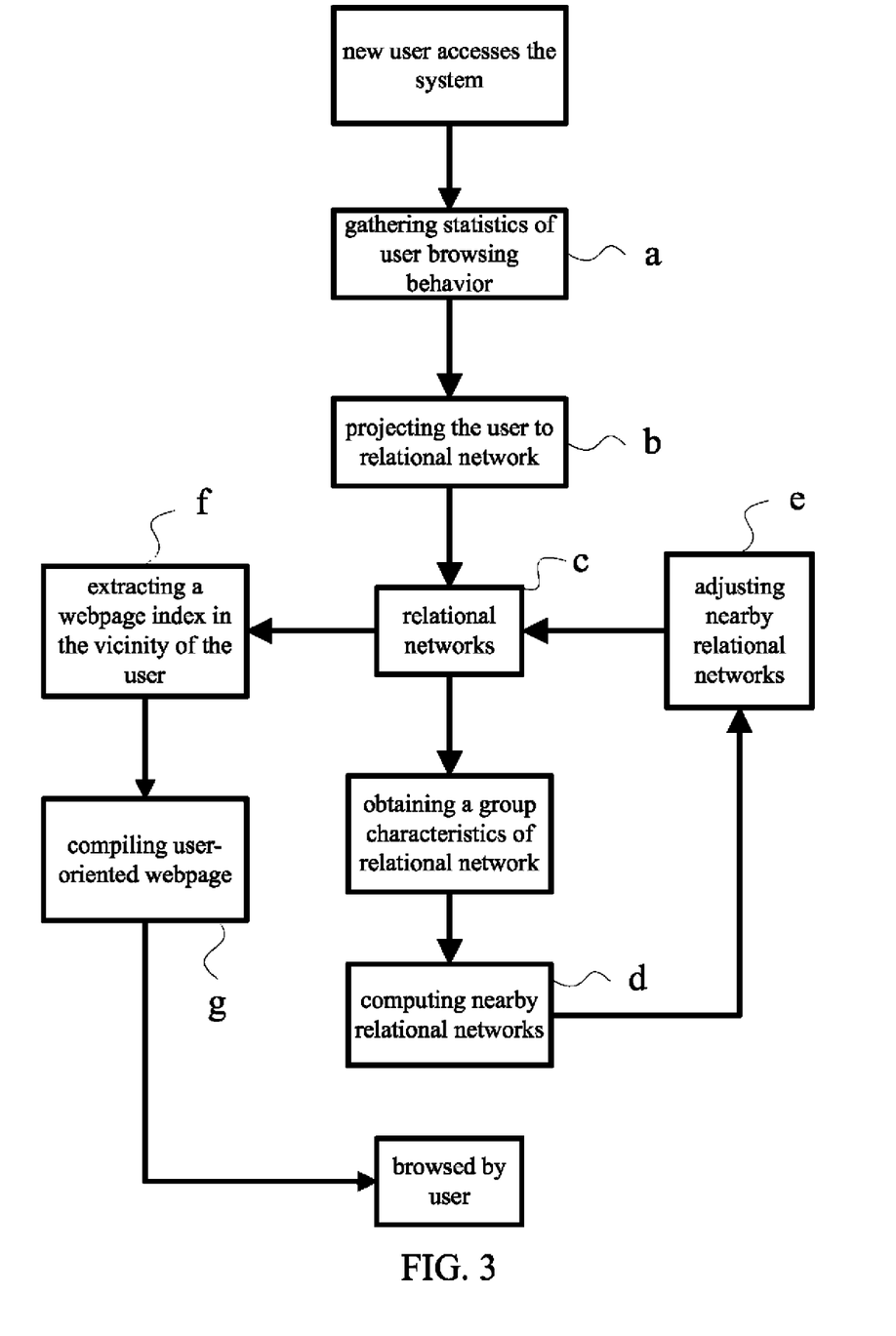
FIG. 3 illustrates the steps of a method for automatic generation of user-oriented webpage.

FIG. 3 illustrates the steps of the method in the present invention: when a new user connects to the network server, the network server gathers statistics of user browsing behavior (a); AI server projects the user to relational network based on statistics (b); obtains group characteristics of relational network for the user (c); computes other nearby relational networks based on the group characteristics (d), adjusts nearby relational networks (e), extracts a webpage index around the user (f), and compiles user-oriented webpage (g) for the next login.

Figure 4:
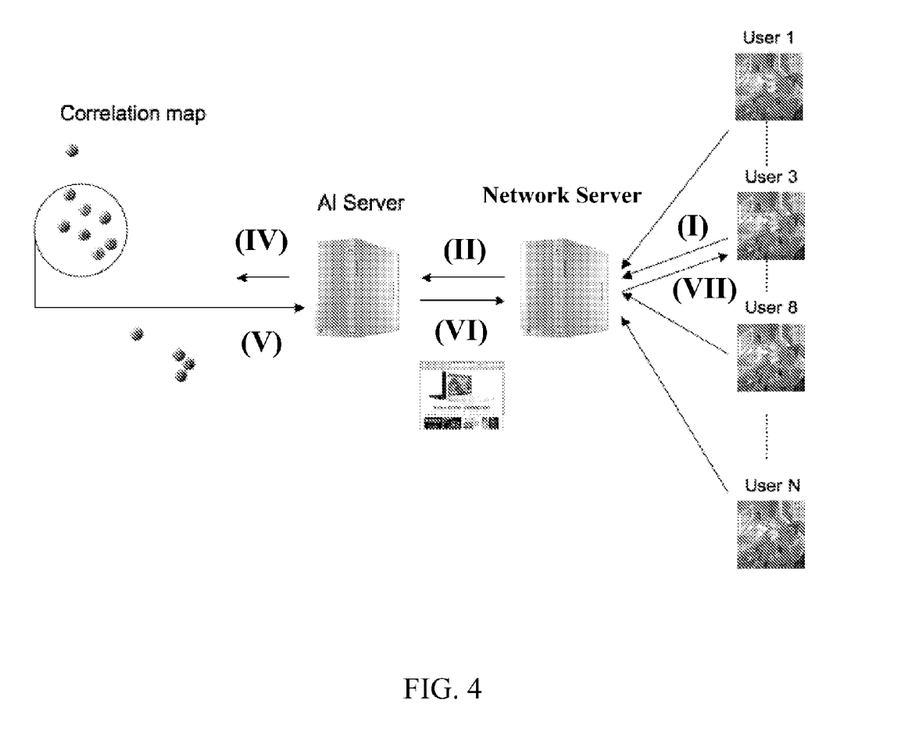
FIG. 4 illustrates a view of data transmission in a system for automatic generation of user-oriented webpage.

FIG. 4 illustrates a view of data transmission in the system disclosed in the present invention. Every time a user browses webpage data from the network server (I); a webpage log data is recorded in the web log recorder in the network server (II); the network server sends the webpage log data to the AI server for computation of relational network (IV); obtains group characteristics distribution results (V); then the AI server automatically compiles a customized webpage based on the group characteristics distribution results and sends the webpage to the network server (VI); the next time when the user connects to the network server, he/she can read the dedicated homepage data which suits his/her preferences and requirements (VII), while the network server continues to record the browsed webpage data of the user. Through the steps, every user can get what he/she desires at the homepage without wasting too much time searching related information in the portal site.

The AI server is designed to implement the algorithm of random-decomposing multidimensional scaling in applied statistics. This algorithm uses Multidimensional Scaling (MDS) method to reduce computation time. Assume X is a Term-Document Matrix, from example, every user is a document, and every one of network behaviors of a user is a term. The matrix formed by aligning every user's data in a column is called a term-document matrix. Suppose X is a p×N, that means there are N users with p different network behaviors. Let D=$X^T X$ to be a matrix multiplication of X, we define $\hat{1}$ to be a N×1 vector with every element of it being 1. Let $$B = \left(X - \frac{1}{N}X\hat{1}\hat{1}^T\right)^T \left(X - \frac{1}{N}X\hat{1}\hat{1}^T\right)$$

to be a matrix multiplication of X shifting with respect to a center. This matrix multiplication can be expressed as:

$$\begin{aligned} B &= \left(X - \frac{1}{N}X\hat{1}\hat{1}^T\right)^T \left(X - \frac{1}{N}X\hat{1}\hat{1}^T\right) \\ &= X^T X - \frac{1}{N}X^T X\hat{1}\hat{1}^T - \frac{1}{N}\hat{1}\hat{1}^T X^T X + \frac{1}{N^2}\hat{1}\hat{1}^T X^T X\hat{1}\hat{1}^T \\ &= D - \frac{1}{N}D\hat{1}\hat{1}^T - \frac{1}{N}\hat{1}\hat{1}^T D + \frac{1}{N^2}\hat{1}\hat{1}^T D\hat{1}\hat{1}^T \\ &= D - \overline{D}_r - \overline{D}_c + \overline{D}_g, \end{aligned}$$

where $\overline{D}_r$ is the matrix derived by subtracting a row average from D. $\overline{D}_c$ is the matrix derived by subtracting a column average from D. $\overline{D}_g$ is the matrix derived by subtracting an ground average from D. Therefore, B matrix can be regarded as the result obtained by performing double centering operation to D matrix. If we define H=I−1/N$\hat{1}\hat{1}^T$, then B can be expressed as B=HDH. Since B is a symmetrical matrix, the singular value decomposition of B is B=$UVU^T$. Therefore, $$\sqrt{B} = X - \frac{1}{N}X11^T = UV^{\frac{1}{2}},$$

the column vector of $\sqrt{B}$ is the coordinates for X shifting with respect to a center.

In building up a relational network, we would try to reduce the order of the coordinates of X to a low dimensional space, for $$\sqrt{B} = X - \frac{1}{N}X11^T = UV^{\frac{1}{2}}$$

the r diagonal values of V forms a diagonal matrix $V_r$, wherein $V_r$ is a r×r matrix, so the coordinates after order reduction is $X = \sqrt{V_r U_r}$. In this coordinate system, two neighboring points have higher correlation than that of two distant points. A fast multidimensional scaling method can improve the speed in performing Latent Semantic Analysis (LSA) so as to allow a site manager to present network users and their network behaviors on the same relational network. Through this user/behavior overlapping relational network, the AI server can distribute specific web pages to specific users. Other than traditional statistics, when a specific user does not change his/her browsing behaviors, the AI server will still change the service contents based on other users' browsing behaviors, making the dedicated webpage data more versatile.

The above-mentioned traditional MDS needs a number of operations equal to O ($N^3$) therefore it is not practical for a server serving over 1,000 users. The present invention provides a randomly decomposing and recombining MDS method called the algorithm of random-decomposing multidimensional scaling in applied statistics. This method can reduce the number of operations to a linear level, O(N), making it viable in implementing real-time operation for a network server serving over 1,000 users.

First we assume p<<N. Under this condition we can prove that the randomly decomposing and recombining MDS method has the same accuracy as the traditional MDS method. Suppose the condition p<<N is not satisfied, we'll provide another auxiliary feature extraction method to force the condition p<<N to be met and to realize a true relational network computation.

Step 1: separating N users into K partially overlapping groups, wherein the number of overlapped users must be larger than p.

Step 2: Obtain corresponding MDS coordinates of every group by using the traditional Multidimensional Scaling method to compute with respect to every group.

Step 3: Obtain a transfer function based on OR decomposing for combining coordinates of different groups. For example, $X_1$ represents the MDS coordinates of the first group. $X_2$ represents the MDS coordinates of the second group. $\overline{X}_1$ and $\overline{X}_2$ are corresponding coordinate matrices for column centering, therefore the transfer function is $X_1 = Q_1 Q_2^T X_2 - Q_1 Q_2^T (\overline{X}_2 1^T) + \overline{X}_1 1^T$. We can use this equation to transfer the coordinates of $X_2$ to the first coordinate system, and then obtain a complete coordinate.

From the above steps, we can reduce the number of operations from O ($N^3$) to O (N). Here is the proof:

Suppose the number of users for every group is $N_g$ and the overlapped number between groups is $N_I$. We separate N users into K groups, so we have the following equation: $KN_g - (K-1)N_I = N$, which is $$K = \frac{(N - N_I)}{(N_g - N_I)} : O(N).$$

We set $N_g = \alpha p$ to be a multiple of p, and the lower limit of $N_I$ is p+1, so the total number of operations is estimated to be:

$$\frac{N-p}{(\alpha-1)p}O(\alpha^3 p^3) + \frac{N-\alpha p}{(\alpha-1)p}O(p^3) : O(p^2 N),$$

when p<<N, the number of operations for O($p^2$N) will be less than O($\sqrt{N}$N), from this, we can prove the present invention can achieve a higher computation speed than the traditional MDS method.

In order to successfully implement the algorithm of random-decomposing multidimensional scaling in applied statistics, the following two essential conditions must be satisfied:

(1) The step of separating N users into K partially overlapping groups has to be random for each group to have both short distance information and long distance information; and (2) The number of overlapped users must be larger than the number of network behavior characteristics.

From the simulation test below, we can see that random grouping is more important than the second essential condition.

Simulation test: FIGS. 5(a)–5(d) illustrate the computation results of projections on 2-dimensional MDS space based on two thousand 8-dimensional helicoids. When executed by a PC equipped with 1.67 GHz CPU and 2 GB RAM, it takes about 20 minutes to come out with the result for the traditional MDS method. However, as to the randomly decomposing and recombining MDS method, it only takes about 9 seconds. After repeating the computation and verification processes, it is confirmed that the error rate is less than $10^{-8}$, therefore it is shown that the present invention can keep the same accuracy while also reduces the computation time.

Figure 5:
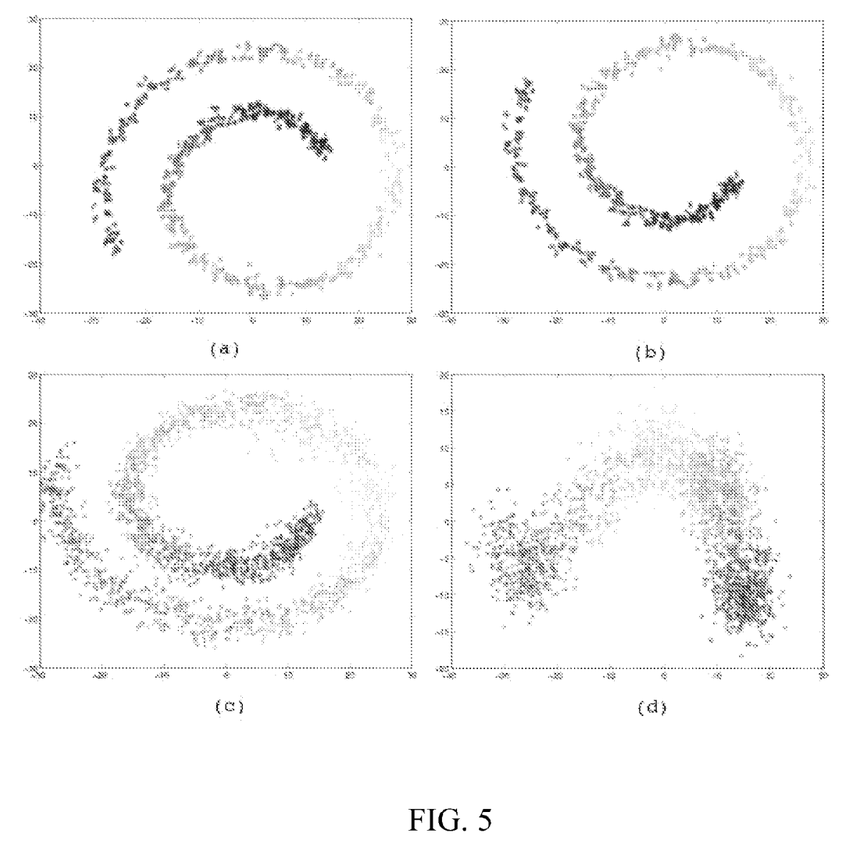
Figure 5A:
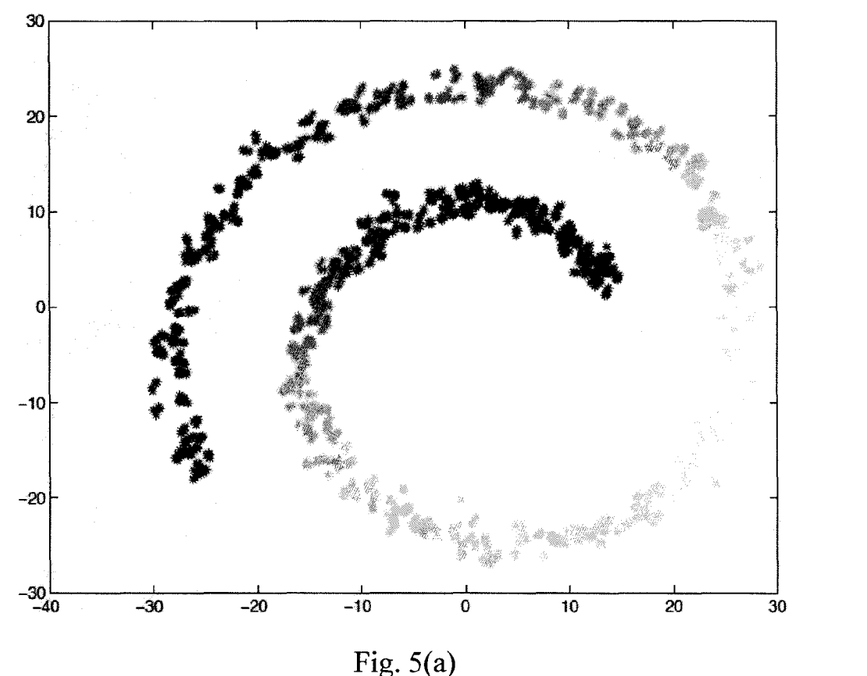
Figure 5B:
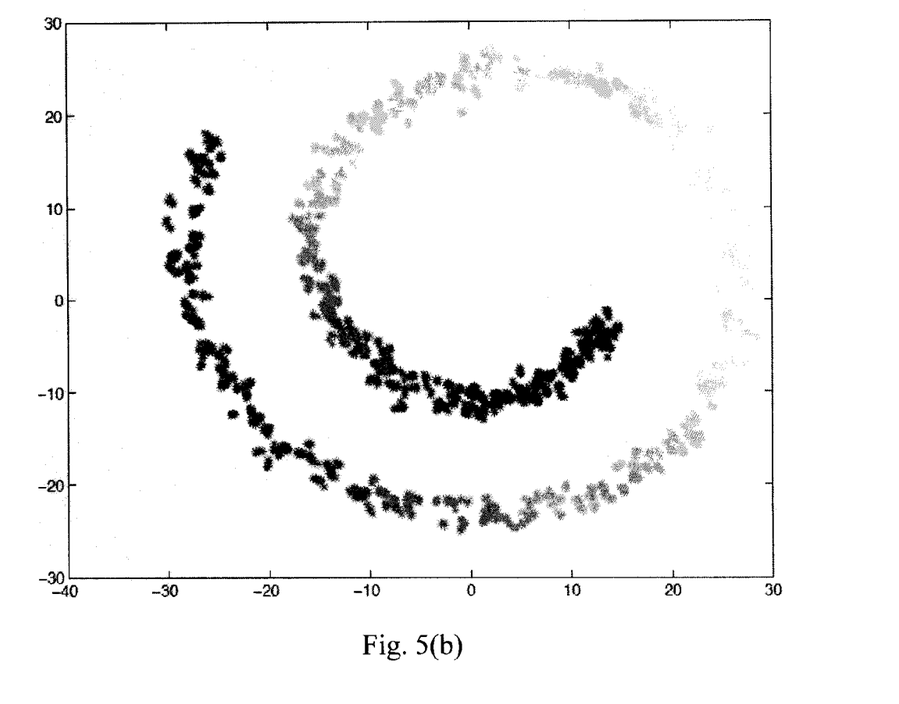
Figure 5C:
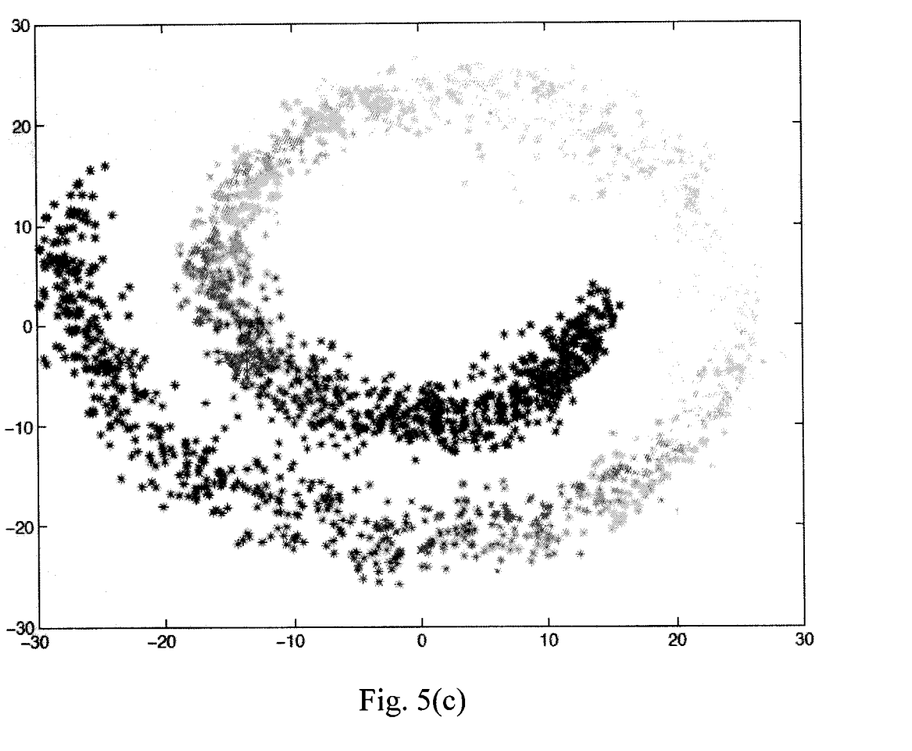
Figure 5D:
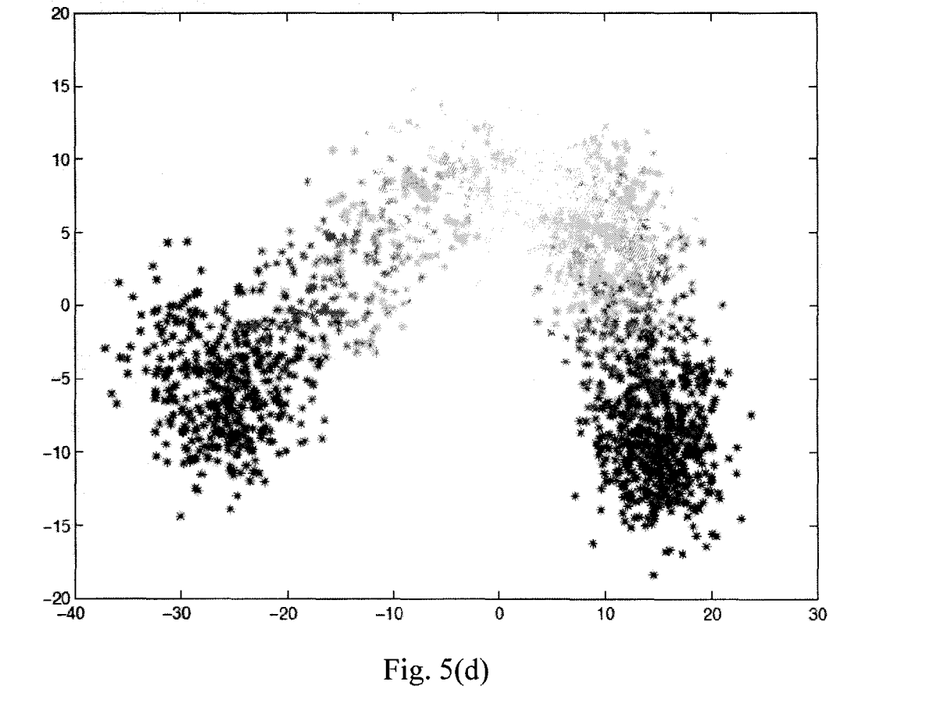

FIG. 5(a) shows the result for the traditional MDS method; FIG. 5(b) shows the result for the randomly decomposing and recombining MDS method working in standard condition. FIG. 5(c) shows the result for the randomly decomposing and recombining MDS method working with only the second essential condition. FIG. 5(d) shows the result for the randomly decomposing and recombining MDS method working with only the first essential condition. From the figures, we can see that random grouping is more important than the second essential condition.

When the number of network behavior characteristics (p) is large, we can use feature extraction technique to determine important features that differentiate groups in a region from groups outside the region. Therefore, keeping each group in the region has little difference compared with each other. Therefore, for groups in the region, we can use the MDS method disclosed in the present invention. Correlation between groups in the region is calculated based on the difference between features, in other words, we can use large-scale calculation with respect to group to calculate large scale MDS. This is similar to the concept of multiple scales, large scale MDS (between groups) is calculated by the difference of features, while small scale MDS (users in a group) is done by randomly decomposing and recombining MDS method. As p increases, to keep the accuracy in calculating large scale MDS, we have to implement order reduction to an extent to decrease the number of p partially. By doing this, it is thus possible to keep the correlation in low dimensional space. Therefore, it is necessary to employ feature extraction method in order reduction to extract important variables for calculating large scale MDS method.

Although there are many feature extraction methods, in order to obtain the accuracy of relational network calculation in the real world, we need a more stable feature extraction method called PCA-RFE (Principal Component Analysis-Recursive Feature Elimination) method. This method is different from SVM-RFE (Support Vector Machine-Recursive Feature Elimination) method in that the PCA-RFE method uses none supported vectors to calculate the feature that causes the main differences between groups. We can prove that when the difference between groups is apparent, PCA-RFE and SVM-RFE are equivalent methods. But as the difference between groups diminishes, the stability of PCA-RFE is much higher than that of SVM-RFE.

Detailed steps of PCA-RFE are as follows:
Step 1: Randomly taking a sample in a group.
Step 2: Calculating a differential vector of groups by using said sample taken in step 1.
Step 3: Calculating a prime term of a difference between groups by using a PCA (principal component analysis) method.
Step 4: Eliminating one or more features having fewer components. This step can eliminate one or more features in one time, and
Step 5: Repeating the above steps until a desired number of features have been obtained.

Figure 6:
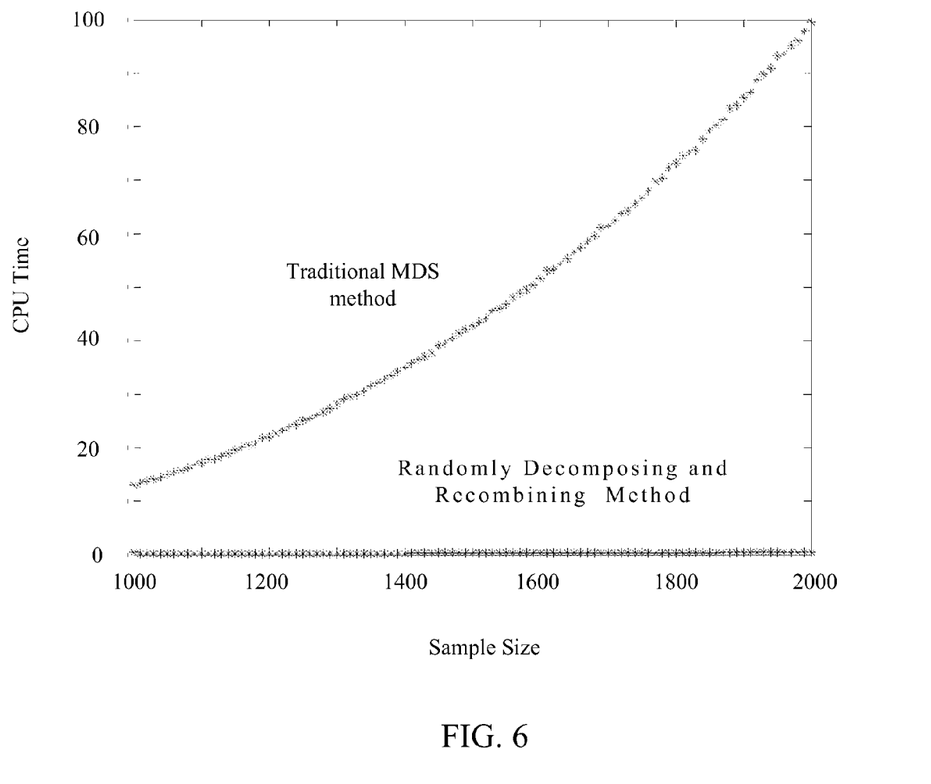
FIG. 6 illustrates a speed comparison chart of MDS methods, wherein the vertical axis represents CPU calculation time, and the horizontal axis represents the number of simulation samples.

FIG. 6 illustrates a speed comparison chart of MDS methods, from which we can show that the stability of PCA-RFE is far more superior to that of SVM-RFE. In carrying out step 4, we can choose to eliminate $p(\frac{1}{2})^k$ features to accelerate the computation. Using randomly decomposing and recombining MDS method under standard condition with fast feature extraction of PCA-RFE, plus large and small scale MDS calculations, it is viable to deal with the condition in which the number of samples (N) and variables (p) are large, while also achieving high speed calculation for relational network.

From above, it can be seen that AI network server can quickly and accurately retrieve a user's network behavior characteristics and transfer the calculated results into a webpage format and automatically compile a customized webpage. Therefore every time when a user points the browser to the same URL, he/she can find preferred network data on the user-oriented page to enhance interaction with the network server.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method for automatic generation of a user-oriented homepage, comprising the steps of:
   a. collecting browsed webpage data of a user by a network server for once in a period of time for an AI server to retrieve said data from said network server or engine in a client;
   b. analyzing a user preference of said user by said AI server and obtaining user network behavior characteristics using an algorithm of random-decomposing multidimensional scaling in applied statistics;
   c. obtaining a correlation map from said user network behavior characteristics and a first relational network for computation, and then obtaining group characteristics of said user in said first relational network;
   d. re-computing nearby relational networks based on said group characteristics of said user in said first relational network to obtain a second relational network of said user;
   e. automatically generating a customized webpage by said AI server based on a webpage index of said second relational network;
   f. sending said customized webpage as said user-oriented homepage to said network server by said AI server for the next time said user connects to said network server; and
   g. automatically sending said customized webpage to a user terminal the next time said user connects to said network server.

2. The method of claim 1, wherein said AI server is implemented with said algorithm of random-decomposing multidimensional scaling in applied statistics, said algorithm comprising the steps of:
   Step 1: separating N users into K partially overlapping groups, the number of overlapped users must be larger than p network behavior characteristics;
   Step 2: obtaining corresponding MDS coordinates of every group by using the traditional Multidimensional Scaling method to compute with respect to every group;
   Step 3: obtaining a transfer function based on OR decomposing to transfer coordinates of every group into coordinates on a first coordinate system; and
   Step 4: projecting an index corresponding to a webpage content in said network server to MDS coordinates based on LSI method.

3. The method of claim 1, wherein said algorithm of random-decomposing multidimensional scaling in applied statistics comprises the following two essential conditions:
   (1) The step of separating N users into K partially overlapping groups has to be random for each group to have both short distance information and long distance information; and
   (2) the number of overlapped users must be larger than the number of network behavior characteristics.

4. The method of claim 2, wherein said algorithm of random-decomposing multidimensional scaling in applied statistics employs a PCA-RFE (Principal Component Analysis-Recursive Feature Eliminated Method) feature extraction method to enhance outcome accuracy, said feature extraction method comprising the steps of:
   Step 1: randomly taking a sample in a group;
   Step 2: calculating a differential vector by using said taken sample in step 1;
   Step 3: calculating a prime term of a difference between groups by using a PCA (Principle component analysis) method;
   Step 4: eliminating one or more features having less components, this step eliminate one or more features in one time; and
   Step 5: repeating the above steps until a desired number of features have been obtained.

5. The method of claim 2, wherein said AI server is able to couple with a general network server.

6. A system for automatic generation of user-oriented homepage, said system comprising:

a plurality of AI servers, which uses the method of claim 1 to compile a customized webpage based on user requirements;

a network server coupling to said plurality of AI servers and recording users' usage data for said plurality of AI servers; and a plurality of user terminals connecting to said network server via Internet and receiving webpage data from said network server.

7. The system of claim 6, wherein said user terminal is a personal computer or a personal digital assistant (PDA).

\* \* \* \* \*